United States Patent

Iwata et al.

(10) Patent No.: US 9,360,048 B2
(45) Date of Patent: Jun. 7, 2016

(54) SLIDING MEMBER

(71) Applicant: DAIDO METAL COMPANY LTD., Nagoya (JP)

(72) Inventors: Hideki Iwata, Inuyama (JP); Yasushi Saito, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 14/663,566

(22) Filed: Mar. 20, 2015

(65) Prior Publication Data

US 2015/0267747 A1 Sep. 24, 2015

(30) Foreign Application Priority Data

Mar. 24, 2014 (JP) ................. 2014-060949
Mar. 24, 2014 (JP) ................. 2014-060950

(51) Int. Cl.

| | |
|---|---|
| *F16C 33/12* | (2006.01) |
| *F16C 33/24* | (2006.01) |
| *F16C 33/22* | (2006.01) |
| *C22C 19/03* | (2006.01) |
| *F16C 33/14* | (2006.01) |
| *F16C 33/20* | (2006.01) |

(52) U.S. Cl.
CPC ............... *F16C 33/128* (2013.01); *C22C 19/03* (2013.01); *F16C 33/125* (2013.01); *F16C 33/127* (2013.01); *F16C 33/145* (2013.01); *F16C 33/22* (2013.01); *F16C 33/24* (2013.01); *F16C 33/20* (2013.01); *F16C 2204/52* (2013.01); *F16C 2204/62* (2013.01); *Y02T 10/865* (2013.01); *Y10T 428/12479* (2015.01); *Y10T 428/12556* (2015.01); *Y10T 428/12569* (2015.01); *Y10T 428/12937* (2015.01); *Y10T 428/12944* (2015.01); *Y10T 428/12958* (2015.01); *Y10T 428/12965* (2015.01); *Y10T 428/12972* (2015.01); *Y10T 428/12979* (2015.01)

(58) Field of Classification Search
CPC ............... Y10T 428/12556; Y10T 428/12569; Y10T 428/12994; Y10T 428/12937; Y10T 428/12958; Y10T 428/12965; Y10T 428/12972; Y10T 428/12979; Y10T 428/12479; Y10T 428/12944; C22C 19/03
See application file for complete search history.

(56) References Cited

U.S. PATENT DOCUMENTS

2008/0146467 A1* 6/2008 Takayama ............. B22F 3/1035
508/105

FOREIGN PATENT DOCUMENTS

| JP | 2001-355634 | 12/2001 |
|---|---|---|
| JP | 2002-061653 | 2/2002 |

(Continued)

*Primary Examiner* — Michael E La Villa
(74) *Attorney, Agent, or Firm* — Harness, Dickey & Pierce, PLC

(57) ABSTRACT

Provided is a sliding member including a steel back metal layer and a sliding layer with a porous sintered layer and a resin composition. The porous sintered layer includes granular Fe or Fe alloy phase and Ni—P alloy phase for binding the Fe or Fe alloy phase grains with one another. The steel back metal layer is made of a carbon steel including 0.05-0.3 mass % of carbon and having a structure composed of ferrite phase and pearlite phase, and includes a low pearlite phase part in a surface thereof on a side of the sliding layer. The low pearlite phase part has a ratio of the pearlite phase is lowered by 50% or more compared with the pearlite phase at a central part in a thickness direction of the steel back metal layer. The Ni—P alloy phase may cover the entire surface of the steel back metal layer.

12 Claims, 3 Drawing Sheets

(56) References Cited

FOREIGN PATENT DOCUMENTS

| JP | 2002-180162 | 6/2002 |
| JP | 2013-083304 | 5/2013 |
| JP | 2013-217493 | 10/2013 |
| JP | 2013-237898 | 11/2013 |

* cited by examiner

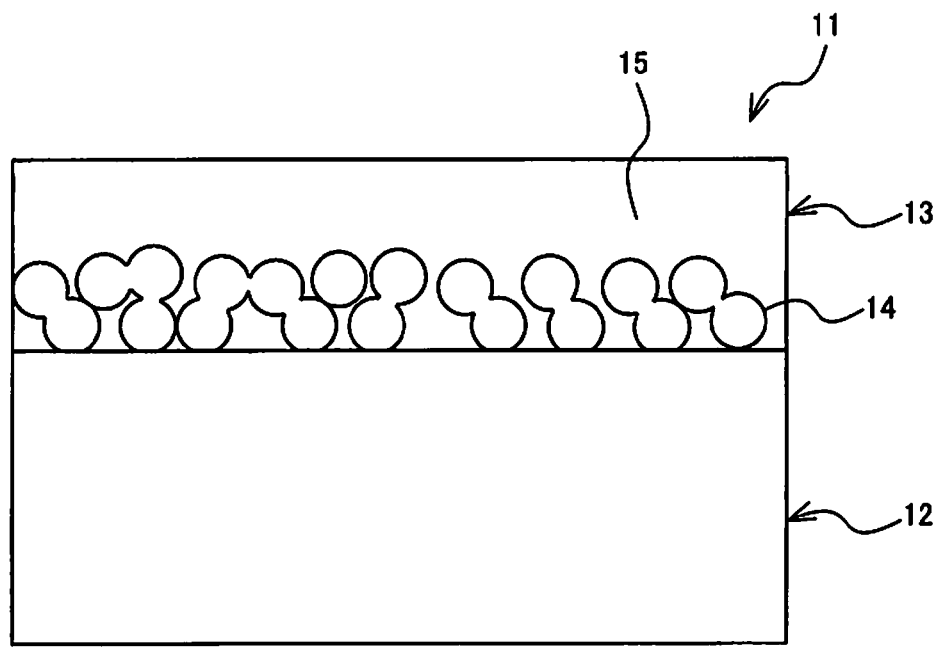

SLIDING MEMBER

CROSS-REFERENCE TO RELATED APPLICATIONS

This application claims the benefit of priority from Japanese Patent Application No. 2014-060949 filed on Mar. 24, 2014 and Japanese Patent Application No. 2014-060950 filed on Mar. 24, 2014, the entire disclosures of which are incorporated herein by reference.

BACKGROUND OF THE INVENTION (1) Field of the Invention

The present invention relates to a sliding member including a sliding layer and a steel back metal, which has high corrosion resistance and high bonding strength between the sliding layer and the steel back metal.

(2) Description of Related Art

Sintered copper alloy materials having a porosity of approximately 5-25% have been conventionally used for a sliding member of a fuel injection pump. A liquid fuel is supplied from an outer surface side of a cylindrical sliding member to an inner surface (sliding surface) side thereof through pores existing in the sliding member, and the sliding member is provided with a lubricating fluid film of the liquid fuel on the inner surface (sliding surface) to support a high-speed rotating shaft. Such sintered copper alloy materials have a problem that the copper alloy is subjected to corrosion due to organic acids or sulfur contained in the fuel, and then the copper corrosion products contaminate the fuel. For this reason, sintered copper alloy sliding materials including Ni, Al and Zn have been proposed to improve the corrosion resistance (see e.g. JP-A-2002-180162, JP-A-2013-217493 or JP-A-2013-237898).

On the other hand, sliding members made of multi-layered sliding materials have been conventionally used. The multi-layered sliding materials include a porous sintered layer of a copper alloy provided on a surface of a steel back metal through a copper plating layer, and further pores and a surface of the porous sintered layer are impregnated and covered with a resin composition (see, e.g. JP-A-2002-61653 and JP-A-2001-355634). It has been proposed to apply such multi-layered sliding materials to the sliding member of the fuel injection pump (see e.g. JP-A-2013-83304).

SUMMARY OF THE INVENTION

Although the sintered copper alloy sliding materials of JP-A-2002-180162, JP-A-2013-217493 and JP-A-2013-237898 have corrosion resistance by including Ni, Al and Zn, the corrosion of the copper alloy due to organic acids or sulfur contained in fuel cannot be completely prevented. Moreover, the sintered copper alloy sliding materials of these documents have a low strength since they include pores throughout the sliding member, and have insufficient loading capability especially for a sliding member used for a common rail-type fuel injection pump shown in JP-A-2013-83304 etc.

The multi-layered sliding materials of JP-A-2002-61653, JP-A-2001-355634 and JP-A-2013-83304 have a high strength, since they include the steel back metal. However, the porous sintered layer composed of a copper alloy is subjected to the corrosion of the copper alloy by organic acids or sulfur contained in the fuel or lubricating oil. For the sliding materials which are produced by spreading and then sintering Fe or Fe alloy powder on a surface of a steel back metal to form a porous sintered layer, without providing a copper plating layer on the surface of the steel back metal like those of the above documents, and then impregnating a resin composition in the porous sintered layer, it has been also revealed that the sliding materials have a lower bonding strength at an interface between the steel back metal and the resin composition.

The present invention has been made in view of the above-described circumstances, and an object of the invention is to provide a sliding member having high corrosion resistance as well as a high bonding strength between the sliding layer and the steel back metal.

In order to achieve the above-described object, one aspect of the present invention provides a sliding member comprising: a steel back metal layer; and a sliding layer including a porous sintered layer and a resin composition. The porous sintered layer includes granular Fe or Fe alloy phase and Ni—P alloy phase functioning as a binder for binding the Fe or Fe alloy phase grains with one another. The steel back metal layer is made of a carbon steel including 0.05-0.3 mass % of carbon and having a structure composed of ferrite phase and pearlite phase. The steel back metal layer includes a low pearlite phase part on a surface thereof on a side of the sliding layer. The low pearlite phase part has a ratio of the pearlite phase lowered by 50% or more compared with the pearlite phase at a center part in a thickness direction of the steel back metal layer.

The porous sintered layer of the sliding layer is composed of the Ni—P alloy phase and the granular Fe or Fe alloy phase and does not include copper. Thus, it has high corrosion resistance against organic acids or sulfur. The Ni—P alloy phase of the porous sintered layer functions as a binder for binding the Fe or Fe alloy phase grains with one another. The steel back metal layer is made of a carbon steel including 0.05-0.3 mass % of carbon, and has a structure composed of the ferrite phase and the pearlite phase. If a carbon steel including lower than 0.05 mass % of carbon is used, the steel back metal layer has a lower strength and thus the sliding member has insufficient strength. On the other hand, if a carbon steel including higher than 0.3 mass % of carbon is used, a ratio of the pearlite phase in the low pearlite phase part of the steel back metal layer becomes higher. Since the low pearlite part is formed in the surface of the steel back metal layer which faces with the sliding layer, and a ratio of the pearlite phase is lowered by 50% or more compared with the pearlite phase at a central part in the thickness direction of the steel back metal layer, difference in thermal expansion between the resin composition of the sliding layer and the low pearlite phase part of the steel back metal layer becomes small. Thereby, shearing between the sliding layer and the back metal layer is less likely to occur and the bonding strength therebetween can be increased.

In an embodiment, the Ni—P alloy phase may cover the entire surface of the steel back metal layer on a side of the sliding layer as well as bind the Fe and Fe alloy phase grains with one another. Since the Ni—P alloy layer covers the entire surface of the steel back metal layer facing with the sliding layer, the resin composition of the sliding layer does not come into direct contact with the steel back metal layer, and thus the bonding strength is enhanced.

In an embodiment, nickel may be diffused into the low pearlite phase part from the Ni—P alloy. Thus, the bonding strength between the resin composition of the sliding layer and the steel back metal layer can be increased.

In an embodiment, the low pearlite phase part may have a thickness of be 1-50 μm. Since the steel back metal layer of a typical sliding member has a thickness of not less than 0.3 mm, the low pearlite phase part having a thickness of not greater than 50 μm does not affect the strength of the steel back metal layer. On the other hand, if the thickness of the low pearlite phase part is less than 1 μm, the low pearlite phase part may partially fail to be formed in the surface of the steel back metal layer facing with the sliding layer.

In an embodiment, an area ratio of the pearlite phase on a surface of the low pearlite phase part may be 0-10%. When the area ratio of the pearlite phase on the surface of the low pearlite phase part is not more than 10%, an effect of enhancing a bonding strength between the sliding layer and the steel back metal layer is improved.

In an embodiment, the Ni—P alloy phase may include 9-13 mass % of phosphorus and the balance of nickel and inevitable impurities. In this compositional range, the Ni—P alloy has a low melting point. More desirably, the Ni—P alloy may include 10-12 mass % of phosphorus and the balance of nickel and inevitable impurities. When rising a temperature in a process of sintering the porous sintered layer on the steel back metal layer, all the Ni—P alloy in the porous sintered layer are liquefied and nickel diffuses into a surface of the steel back metal layer. This diffusion of nickel into the surface of the steel back metal layer has an effect on formation of the low pearlite phase part in the surface of the steel back metal layer. If the Ni—P alloy includes lower than 9 mass % or higher than 13 mass % of phosphorus, the melting point of the Ni—P alloy becomes higher. Then, an amount of liquid phase of the Ni—P alloy generated during the sintering step is small, and it is difficult to diffuse nickel into the surface of the steel back metal layer and to form the low pearlite phase part in the surface of the steel back metal layer.

In an embodiment, a ratio of the Ni—P alloy phase in the porous sintered layer may be 5-40 mass %, i. e. the Ni—P alloy phase has 5-40 part by mass in relation to 100 part by mass of the porous sintered layer. The Ni—P alloy phase binds the Fe or Fe alloy phase grains with one another and/or binds the Fe or Fe alloy phase grains with the surface of the steel back metal layer. If the ratio of the Ni—P alloy phases is lower than 5 part by mass, strength of the porous sintered layer and bonding strength between the porous sintered layer and the steel back metal layer become insufficient. On the other hand, if the ratio of the Ni—P alloy phases is higher than 40 part by mass, the porous sintered layer has too low porosity, since portions which should be left as pores are filled with the liquid-phase Ni—P alloy during the sintering step.

BRIEF DESCRIPTION OF THE DRAWING

FIG. 5 is a schematic view showing a conventional sliding member.

DETAILED DESCRIPTION OF THE INVENTION

Figure 1:
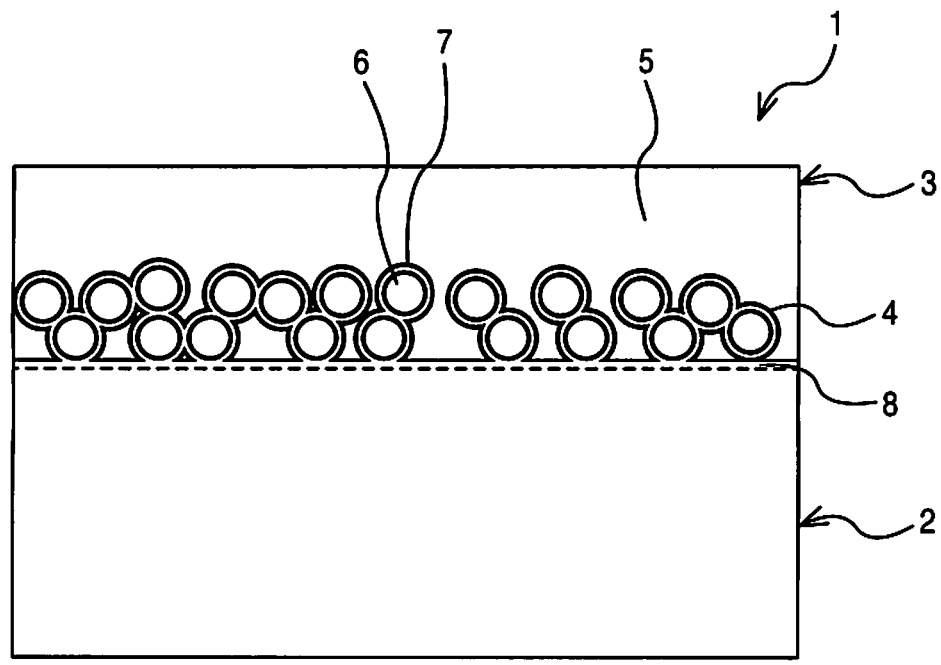
FIG. 1 is a schematic view showing a cross-section of a sliding member according to one embodiment of the present invention.
Figure 2:
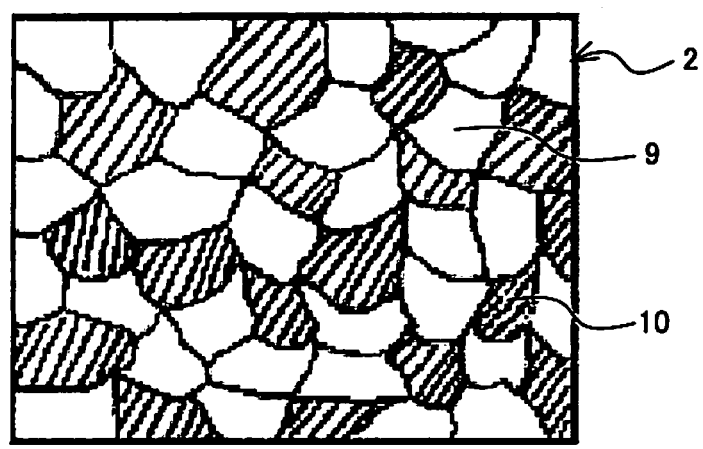
FIG. 2 is an enlarged view showing a structure of the steel back metal layer of FIG. 1 near a central part in a thickness direction.
Figure 3:
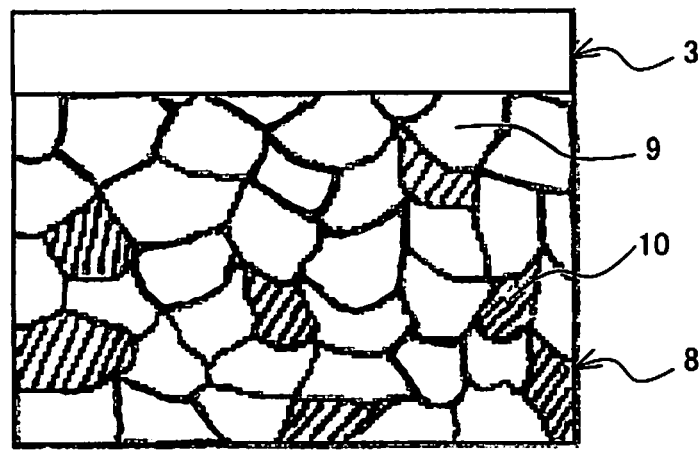
FIG. 3 is an enlarged view showing a structure near a surface of the steel back metal layer of FIG. 1.

A sliding member 1 according to one embodiment of the present invention will be described with reference to FIGS. 1 to 3. FIG. 1 is a schematic view showing a cross-section of the sliding member 1, in which a low pearlite phase part 8 is formed in a surface of a steel back metal layer 2. FIG. 2 is an enlarged view showing a structure of the steel back metal layer 2 in the vicinity of a central part in a thickness direction, and FIG. 3 is an enlarged view showing a structure near a surface of the steel back metal layer 2.

As shown in FIG. 1, the sliding member 1 includes the steel back metal layer 2 and a sliding layer 3. The sliding layer 3 includes a porous sintered layer 4 on the steel back metal layer 2, and a resin composition 5. The porous sintered layer 4 includes granular Fe or Fe alloy phase 6 and Ni—P alloy phase 7. The Ni—P alloy phase 7 functions as a binder that binds the grains of the Fe or Fe alloy phase 6 with one another and/or binds the grains of the Fe or Fe alloy phases 6 with a surface of the steel back metal layer 2. As shown in FIG. 1, the Ni—P alloy phase 7 bonds between the grains of the Fe and Fe alloy phases 6 and/or between the grains of the Fe or Fe alloy phases 6 and the surface of the steel back metal layer 2. Partial direct contact or bond may be formed, through a sintering step, between the grains of the Fe or Fe alloy phases 6 and/or between the grains of the Fe or Fe alloy phase 6 and the surface of the steel back metal layer 2. The surfaces of the grains of the Fe or Fe alloy phases 6 may be partially uncovered by the Ni—P alloy phase 7. The porous sintered layer 4 includes pores to be impregnated with the resin composition 5. The porosity is 10-60%, more preferably 20-40%.

The Ni—P alloy phase 7 has a composition including 9-13 mass % of phosphorus and the balance of nickel and inevitable impurities. This composition of the Ni—P alloy phase 7 is determined such that the Ni—P alloy has a lower melting point. More desirably, the composition of the Ni—P alloy phase 7 includes 10-12 mass % of phosphorus and the balance of nickel and inevitable impurities. In increasing a temperature during a process of sintering the porous sintered layer 4 on the steel back metal layer 2, as will be described later, the Ni—P alloy phase 7 in the porous sintered layer 4 are all liquefied and nickel is diffused into the surface of the steel back metal layer 2. This nickel diffusion into the surface of the steel back metal layer 2 has an effect of forming the low pearlite phase part 8 in the surface of the steel back metal layer 2. If the phosphorus content is lower than 9 mass % or higher than 13 mass % in the composition of the Ni—P alloy phase 7, a melting point of the Ni—P alloy becomes higher. This results in generation of a smaller amount of liquid phase of the Ni—P alloy during the sintering step, and thus makes it difficult to diffuse nickel into the surface of the steel back metal layer 2 and to form the low pearlite phase part 8 therein.

The composition of the Ni—P alloy phase 7 may further include one or more selected from 1-4 mass % of boron, 3-12 mass % of silicon and 7-14 mass % of chromium.

A ratio of the Ni—P alloy phase 7 in the porous sintered layer 4 is such that the Ni—P alloy phase 7 has 5-40 part by mass, more preferably 10-20 part by mass, in relation to 100 part by mass of the porous sintered layer 4. This ratio of the Ni—P alloy phase 7 is suitable for forming the porous sintered layer 4 where the Ni—P alloy phase 7 is in the form of binder which binds the grains of the Fe or Fe alloy phase 6 with one another and/or the grains of the Fe or Fe alloy phase 6 with the surface of the steel back metal layer 2. If the ratio of the Ni—P alloy phase 7 is lower than 5 part by mass, strength of the porous sintered layer 4 and a bonding strength between the porous sintered layer 4 and the steel back metal layer 2 become insufficient. On the other hand, if the ratio of the Ni—P alloy phases 7 is higher than 40 part by mass, the porous sintered layer 4 becomes to have too low porosity, since portions which should be left as pores are filled with the Ni—P alloy during the sintering step.

The granular Fe or Fe alloy phase 6 in the porous sintered layer 4 may have an average grain size of 45-180 μm. The composition of the granular Fe alloy is not limited. Commercially available particles of pure iron, hypo-eutectoid steel, eutectoid steel, hyper-eutectoid steel, cast iron, high-speed steel, tool steel, austenitic stainless steel, ferritic stainless steel, etc. may be used. Whichever Fe alloy is used, a corrosion resistance against organic acids or sulfur is higher compared with the case where the conventional copper alloy is used. A reactional phase generated by a reaction with the Ni—P alloy phase 7 may be formed on a surface (i.e. the surface facing with the Ni—P alloy phase 7) of the grains of the Fe or Fe alloy phase 6 composing the porous sintered layer 4. Since the porous sintered layer 4 is composed of such granular Fe or Fe alloy phase 6 and Ni—P alloy phase 7 and does not include copper, it has excellent corrosion resistance against organic acids or sulfur.

The resin composition 5 is impregnated in the pores and coats a surface of the porous sintered layer 4. As shown in FIG. 1, the resin composition 5 may be partially in contact with a surface of the steel back metal layer 2. The resin composition 5 may be typical resin compositions used for sliding applications. Specifically, the resin composition may include one or more of fluororesin, polyetheretherketone, polyamide, polyimide, polyamide-imide, polybenzimidazole, epoxy, phenol, polyacetal, polyethylene, polypropylene, polyolefin, and polyphenylene sulfide, and further include, as a solid lubricant, one or more of graphite, graphene, graphite fluoride, molybdenum disulfide, fluororesin, polyethylene, polyolefin, boron nitride, and tin disulfide. One or more of granular or fibrous metal, metal compound, ceramic, inorganic compound, and organic compound may be incorporated as a filler into the resin composition 5. However, the resin, the solid lubricant, and the filler composing the resin composition 5 are not limited to the examples given here.

A carbon steel (hypo-eutectoid steel) including 0.05-0.3 mass % of carbon is used for the steel back metal layer 2. As shown in FIG. 2, the steel back metal layer 2 has a structure composed of ferrite phase 9 and pearlite phase 10. If a carbon steel with a carbon content of lower than 0.05 mass % is used, the steel back metal layer 2 has a lower strength and a strength of the sliding member 1 becomes insufficient. On the other hand, if a carbon steel with a carbon content of higher than 0.3 mass % is used, a ratio of the pearlite phases 10 in the low pearlite phase part 8 of the steel back metal layer 2 becomes higher.

The composition of the steel back metal may include one or more selected from not more than 0.1 mass % of silicon, not more than 1 mass % of manganese, not more than 0.04 mass % of phosphorus, and not more than 0.04 mass % of sulfur, in addition to the above-described carbon content, and the balance of iron and inevitable impurities. While the structure of the steel back metal layer 2 is composed of the ferrite phase 9 and the pearlite phase 10, it may include fine precipitates (i.e. precipitate phases which can not be detectable by observation with a scanning electron microscope at 1000-fold magnification).

The ferrite phase 9 in the steel back metal layer 2 includes low carbon of up to 0.02 mass % and thus it is has a composition close to pure iron. On the other hand, the pearlite phases 10 in the steel back metal layer 2 has a lamellar structure of ferrite phase and cementite phase of iron carbides ($Fe_3C$), which form alternating laminar layers. The pearlite phase 10 includes a larger amount of carbon than the ferrite phase 9. As shown in FIG. 3, the low pearlite phase part 8, in which the ratio of the pearlite phase 10 is lowered by 50% or more compared with that at a central part in a thickness direction of the steel back metal layer 2, is formed in a surface of the steel back metal layer 2 facing with the sliding layer 3.

A cross-sectional structure of the sliding member 1 in a direction parallel to the thickness direction was observed with an electron microscope, and an electron image of the steel back metal layer 2 near the central part in the thickness direction and that of the steel back metal layer 2 and near the surface facing with the sliding layer 3 were taken at 500-fold magnification. The images were analyzed by typical image analysis means (analysis software: Image-Pro Plus (Version 4.5) by Planetron, Inc.) to measure an area ratio of the pearlite phase 10 in the structure. Thus, it can be confirmed that the low pearlite phase part 8 is formed in the surface of the steel back metal layer 2 facing with the sliding layer 3, since the ratio (area ratio) of the pearlite phases 10 in the structure of the steel back metal layer 2 near the surface facing with the sliding layer 3 is lowered by 50% or more compared with the pearlite phase 10 in the structure at the central part in the thickness direction of the steel back metal layer 2. The area for the observation of the area ratio of the pearlite phases 10 near the central part of the steel back metal layer 2 in the thickness direction does not have to be strictly the center position of the steel back metal layer 2 in the thickness direction. This is because the steel back metal layer 2 has substantially same structure from the center position in the thickness direction to the low pearlite phase part 8 (i.e. the area ratio of the pearlite phases 10 does not change).

A thickness of the above-described low pearlite phase part 8 is 1-50 μm from the interface with the sliding layer 3. The thickness is preferably 1-10 μm. Since a thickness of the steel back metal layer 2 of a typical sliding member is at least 0.5 mm, the low pearlite phase part 8 having a thickness of not more than 50 μm does not affect a strength of the steel back metal layer 2. On the other hand, if the thickness of the low pearlite phase part 8 is less than 1 μm, the low pearlite phase part 8 may partially fail to be formed in the surface of the steel back metal layer 2 facing with the sliding layer 3.

The low pearlite phase part 8 of the steel back metal layer 2 facing with the sliding layer 3 includes nickel that is diffused from the Ni—P alloy phase 7 in the porous sintered layer 4. The diffused nickel atoms are dissolved in the ferrite phases 9 in the low pearlite phase part 8 near the surface thereof. Although the amount of nickel diffused from the Ni—P alloy phase 7 of the porous sintered layer 4 into the low pearlite phase part 8 of the steel back metal layer 2 is very trace, EPMA (electron probe microanalyzer) measurement confirmed that nickel is diffused into the low pearlite phase part 8. It could be also confirmed that nickel in the low pearlite phase part 8 dissolves in the ferrite phase 9, and a nickel concentration decreases gradually from a surface of the low pearlite phase part 8 facing with the sliding layer 3 toward the inside thereof. $Ni_3P$ phase (intermetallic compound) is not formed in the low pearlite phase part 8.

Due to the nickel diffusion, an amount of the pearlite phase 10 is particularly low at the surface of the low pearlite phase part 8 of the steel back metal layer 2. The area ratio of the pearlite phases 10 at the surface of the low pearlite phase part 8 is preferably 0-10% in order to enhance a bonding strength between the resin composition 5 of the sliding layer 3 and the low pearlite phase part 8 of the steel back metal layer 2.

Figure 4:
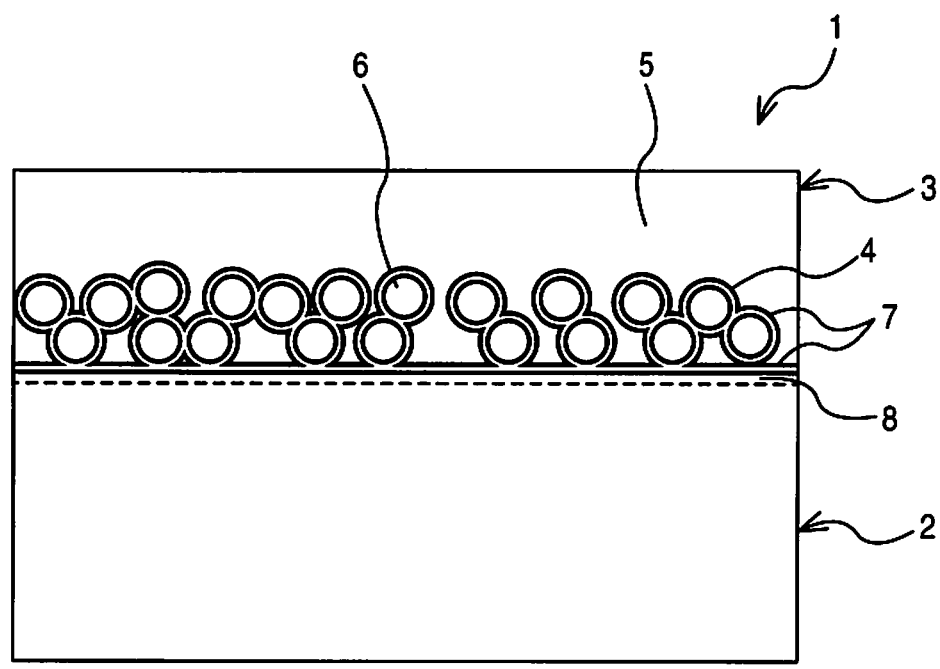
FIG. 4 is a schematic view showing a cross-section of a sliding member according to another embodiment of the present invention.

FIG. 4 shows a sliding member 1 according to another embodiment of the present invention. The embodiment shown in FIG. 4 differs from that in FIG. 1 in the following point: the Ni—P alloy phase 7 of the porous sintered layer coats the entire surface of the steel back metal layer on a side of the sliding layer as well as binds the grains of Fe or Fe alloy phase 6 with one another. Other configurations are same as those of the embodiment shown in FIG. 1 and described above. In this embodiment, the resin composition 5 of the sliding layer 3 does not come into direct contact with the steel back metal layer 2. Further, the low pearlite phase part 8 is formed. Thus, shearing due to thermal expansion coefficient difference between the ferrite phase 9 and the pearlite phase 10 is less likely to occur at the interface between the Ni—P alloy phases 7 of the sliding layer 3 and the steel back metal layer 2.

Next, bonding between a resin composition 15 of a sliding layer 13 and a steel back metal layer 12 in a conventional sliding member 11 will be described with reference to FIG. 5. FIG. 5 is a schematic view showing the conventional sliding member 11 with a porous sintered layer 14 formed on the steel back metal layer 12.

If there is a large amount of pearlite phase at the surface of the steel back metal layer 12 facing with the sliding layer 13, bonding strength between the sliding layer 13 and the resin composition 15 decreases. As shown in FIG. 5, if such a steel back metal layer 12 is used for the sliding member 11, shearing can occur locally at an interface between the resin composition 15 of the sliding layer 13 and the steel back metal layer 12. This is because, a shear stress is generated at the interface between the resin composition 15 of the sliding layer 13 and the steel back metal layer 12 due to a larger thermal expansion of the resin composition 15 than that of the steel back metal layer 12 when the working temperature of the sliding member 11 rises.

The ferrite phase and the pearlite phase in the steel back metal layer 12 have different thermal expansion coefficient from each other. Since the pearlite phase includes cementite (Fe$_3$C), which is iron carbide, it has a lower thermal expansion coefficient than the ferrite phase. Therefore, when a temperature of the sliding member 11 rises, a shear force due to the thermal expansion difference between the resin composition 15 and the steel back metal layer 12 becomes uneven at the interface. At the interface where the difference in thermal expansion is large, a minute shearing part is formed by the shear stress due to the difference in thermal expansion. It is supposed that the larger the area of the pearlite phases is at the surface of the steel back metal layer 12, the larger is the area where the minute shearing occurs, and this shearing propagates to the interface between the resin composition 15 of the sliding layer 13 and the ferrite phases of the steel back metal layer 12. In the embodiments of the invention, shearing is less likely to occur between the sliding layer 3 and the steel back metal layer 2 since the low pearlite phase part 8, in which the ratio of the pearlite phases 10 is lowered by 50% or more compared with the pearlite phases 10 in the inside of the steel back metal layer 2, is formed in the surface of the steel back metal layer 2 facing with the sliding layer 3. In the case of the embodiment shown in FIG. 4 in which an Ni—P alloy layer 17 is formed so as to cover the entire surface of the steel back metal layer 2, the above-described problem is further prevented since the resin composition 5 of the sliding layer 3 does not come into direct contact with the steel back metal layer 2.

Next, a process for producing the sliding member 1 according to the embodiments will be described. First, a mixed powder of an Fe or Fe alloy powder and a Ni—P alloy powder is prepared. In preparing the mixed powder, it is necessary to add components which will become the Ni—P alloy phase 7 of the porous sintered layer 4, in a form of the Ni—P alloy powder. After the mixed powder is spread on a steel plate at a room temperature, the mixed powder is sintered in a reducing atmosphere at 930-1000° C. using a sintering furnace without pressurizing the spread powder layer.

During the sintering step, the Ni—P alloy particles including 9-13 mass % of phosphorus and the balance of nickel start to melt when the temperature reaches 880° C. in the process of rising the temperature. The liquid phase flows between adjacent grains of Fe or Fe alloy or between the grains of Fe or Fe alloy and a surface of the steel back metal layer 2, and the porous sintered layer 4 starts to be produced on the surface of the steel back metal layer 2. The Ni—P alloy grains including 9-13 mass % of phosphorus and the balance of nickel are completely liquefied at 950° C. The Ni—P alloy grains with a narrower phosphorus range, which includes 9-12 mass % of phosphorus and the balance of nickel, are completely liquefied at 930° C.

The sintering temperature is set to a temperature equal to or higher than the temperature at which the Ni—P alloy grains are completely melted. As will be described later, the composition of the Ni—P alloy is such that it is completely melted at a temperature equal to or higher than the temperature (A3 transformation point) at which the structure of the steel back metal layer 2 is completely transformed to austenitic phase.

When the temperature reaches 727° C. (A1 transformation point) in the process of rising the temperature during the sintering step, the composition of the steel back metal layer 2 including the ferrite phase 9 and the pearlite phase 10 starts transforming into an austenitic phase. Since the steel back metal layer 2 includes a carbon content of 0.05-0.3 mass %, it has a structure entirely composed of an austenitic phase at 900° C. Since the austenitic phase has a larger interstice (distance) between iron atoms than that of the ferrite phase 9, nickel atoms of the Ni—P alloy phase 7 in the porous sintered layer 4 is facilitated to diffuse and enter the interstice. As described above, the Ni—P alloy composition is made such that it completely melts at or above a temperature at which the structure of the steel back metal layer 2 is completely austenitized (A3 transformation point), and the sintering temperature is set at or above the temperature at which the Ni—P alloy grains completely melt. This is because nickel atoms are more likely to be diffused into the austenitic phase in the surface of the steel back metal layer 2 when the Ni—P alloy phase 7 is in the liquid phase than a solid phase.

Nickel atoms diffuse not only in areas of the steel back metal layer 2 that is direct contact with the porous sintered layer 4 but also portions of the steel back metal layer 2 that are not in direct contact with the porous sintered layer 4 from the contacting areas.

In combination of the facts that the Ni—P alloy is completely liquefied and that the structure of the steel back metal layer 2 is completely austenitized during the sintering step, diffusion of nickel atoms in the surface of the steel back metal layer is facilitated. As the nickel atoms dissolve in the austenitic phase, carbon atoms which have dissolved in the interstices of iron atoms of the austenitic phase are forced out and diffused toward the inside of the steel back metal layer 2. Under the temperature and the time period of the sintering step, the nickel atoms diffuses only in an area near the surface of the steel back metal layer 2.

When the temperature returns to 727° C. (A1 transformation point) in the step of cooling after the sintering step, the steel back metal layer 2 turns back to the structure composed of the ferrite phases 9 and the pearlite phases 10. It is presumed that, due to the mechanism having been described, the inside of the steel back metal layer 2 has a normal structure composed of the ferrite phases 9 and the pearlite phases 10 (where a ratio of the pearlite phases 10 depends on a carbon content) and the low pearlite phase part 8 having a structure in which the ratio of the pearlite phases 10 is lowered compared with the inside (i.e. the extreme surface of the steel back metal layer 2 is composed almost entirely of the ferrite phases 9) is formed in the surface of the steel back metal layer 2 on a side of the sliding layer 3. The nickel atoms are contained in the steel back metal layer 2 while being dissolved in the ferrite phases 9 near the surface of the low pearlite phase part 8.

A resin composition 5 prepared in advance, which may be diluted with an organic solvent, is impregnated in the member including the steel back metal layer 2 and the porous sintered layer 4 formed on the steel back metal layer 2 as described above, so that the resin composition 5 fills pores of the porous sintered layer 4 and covers the surface of the porous sintered layer 4. Then, this member is heated to dry and baked the resin composition 5, and thus the sliding layer 3 including the porous sintered layer 4 and the resin composition 5 are formed on the surface of the steel back metal layer 2.

A cold-rolled steel plate (or strip) is desirably used as a material of the steel back metal layer 2. The cold-rolled steel plate is introduced with distortion (or atomic vacancy) into a crystalline structure thereof during a rolling process. This distortion induces a defect of an atomic-level vacancy that an iron atom is absent at a position where it is to be present. While the distortion of crystals structure in the steel back metal layer 2 moves gradually toward a surface of the steel back metal layer 2 and disappear in the heating step during the sintering process, nickel atoms of the Ni—P alloy phases 7 diffuse to the portions where the distortion has been present in the crystals on the surface side of the steel back metal layer 2 so as to take the place of the distortion. On the other hand, if a hot-rolled steel plate is used, diffusion of nickel atoms in the surface of the steel back metal layer is less likely to occur since there is very little distortion of the crystal structure in the hot-rolled steel plate.

In this description, mixed powder of Fe or Fe alloy powder and Ni—P alloy powder is used. If Fe—Ni—P alloy powder produced through an atomizing method etc. is used, or if mixed powder of Ni powder and Fe—P alloy powder is used, only part of nickel and phosphorus of the powder composition is liquefied during the sintering step and thus the generated amount of liquid phases is small. Therefore, almost no diffusion of the nickel atoms into the surface of the steel back metal layer occurs. Accordingly, the low pearlite phase part, where the ratio of the pearlite phases is lowered, is not formed in the surface of the steel back metal layer. Since this liquid phase is mainly composed of $Ni_3P$, the $Ni_3P$ phase (intermetallic compound) is formed at the interface between the porous sintered layer and steel back metal layer after the sintering step. The $Ni_3P$ phase is hard but brittle, and makes the bonding between the porous sintered layer and the steel back metal layer very weak.

It should be avoided that the alloy composition of the porous sintered layer 4 contains tin having a low melting point. Since tin has a low melting point and is liquefied at approximately 232° C. at the very beginning of temperature rise during the sintering step, the liquefied tin atoms and the iron atoms of the steel back metal layer will react to create $Fe_2Sn$ phase or $Fe_3Sn$ phase (intermetallic compounds) at the interface between the porous sintered layer and the steel back metal layer. The $Fe_2Sn$ phase and $Fe_3Sn$ phase are hard but brittle, and make the bonding between the porous sintered layer and the steel back metal layer very weak. If copper is added in the alloy composition of the porous sintered layer including tin (e.g., copper is added in an amount of three to four times, by mass, the content of tin), the formation of the $Fe_2Sn$ phase and the $Fe_3Sn$ phase is prevented or reduced at the interface between the porous sintered layer and the steel back metal layer, since tin having been liquefied during the sintering step is diffused to copper. However, corrosion resistance against organic acids and sulfur becomes lower since the porous sintered layer contains copper.

Although the low pearlite phase part 8 is formed in the surface of the steel back metal layer 2, if a steel plate with previously applied iron plating layer or nickel plating layer on the surface is used, the sliding member becomes expensive.

If a steel plate having an electroless Ni—P alloy plating layer formed previously on its surface is used, a large amount of $Ni_3P$ phase (intermetallic compounds) is precipitated at an interface between the steel back metal layer and the Ni—P alloy plating layer in the process of rising a temperature during the sintering step, and makes the bonding between the sliding layer and the steel back metal layer weak. This relates to the fact that the crystal structure of the electroless Ni—P alloy plating layer is amorphous. The crystal structure of the electroless Ni—P alloy plating layer changes from amorphous to crystalline in the process of temperature rise during the sintering step, and at the same time a large amount of $Ni_3P$ phase (intermetallic compounds) are precipitated. When the crystal structure of the electroless Ni—P plating layer changes from amorphous to crystalline, a shear force is generated at the interface with the surface of the steel plate and minute shear deformed parts are formed, which will be the cause of the precipitation of the large amount of $Ni_3P$ phase (intermetallic compounds) in the vicinity of the minute shear deformed parts.

Since the embodiments of the invention does not need such step of forming a plating layer on a surface of a steel plate but form the low pearlite phase part 8 during the sintering step of the porous sintered layer 4, the sliding member 1 can be produced at a low cost.

The invention claimed is:

1. A sliding member comprising a steel back metal layer and a sliding layer, the sliding layer including a porous sintered layer and a resin composition,
    wherein the porous sintered layer includes granular Fe or Fe alloy phase and Ni—P alloy phase functioning as a binder for binding the Fe or Fe alloy phase grains with one another,
    wherein the steel back metal layer is made of a carbon steel including 0.05-0.3 mass % of carbon and having a structure composed of ferrite phase and pearlite phase, and
    wherein the steel back metal layer includes a low pearlite phase part in a surface thereof on a side of the sliding layer, the low pearlite phase part having a ratio of the pearlite phase lowered by 50% or more compared with the pearlite phase at a central part in a thickness direction of the steel back metal layer.

2. The sliding member according to claim 1, wherein nickel is diffused into the low pearlite phase part from the Ni—P alloy phase.

3. The sliding member according to claim 1, wherein the low pearlite phase part has a thickness of 1-50 μm.

4. The sliding member according to claim 1, wherein an area ratio of pearlite phase on a surface of the low pearlite phase part is 0-10%.

5. The sliding member according to claim 1, wherein the Ni—P alloy phase comprises 9-13 mass % of P and the balance being Ni and inevitable impurities.

6. The sliding member according to claim 1, wherein the porous sintered layer has a ratio of the Ni—P alloy phase such that the Ni—P alloy phase has 5-40 part by mass in relation to 100 part by mass of the porous sintered layer.

7. The sliding member according to claim 1, wherein the Ni—P alloy phase covers the entire surface of the steel back metal layer on a side of the sliding layer as well as binds the Fe or Fe alloy phase grains with one another.

8. The sliding member according to claim 7, wherein nickel is diffused into the low pearlite phase part from the Ni—P alloy phase.

9. The sliding member according to claim 7, wherein the low pearlite phase part has a thickness of 1-50 μm.

10. The sliding member according to claim 7, wherein an area ratio of pearlite phase on a surface of the low pearlite phase part is 0-10%.

11. The sliding member according to claim 7, wherein the Ni—P alloy phase comprises 9-13 mass % of P and the balance being Ni and inevitable impurities.

12. The sliding member according to claim 7, wherein the porous sintered layer has a ratio of the Ni—P alloy phase such that the Ni—P alloy phase has 5-40 part by mass in relation to 100 part by mass of the porous sintered layer.

* * * * *